(12) United States Patent
Kalweit et al.

(10) Patent No.: US 6,530,358 B2
(45) Date of Patent: Mar. 11, 2003

(54) METHOD FOR CONTROLLING AN INTERNAL COMBUSTION ENGINE

(75) Inventors: Dieter Kalweit, Schorndorf; Sven Merkle, Stuttgart; Andrej Panten, Korb; Tobias Roulet, Leonberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 18 days.

(21) Appl. No.: 09/955,482

(22) Filed: Sep. 17, 2001

(65) Prior Publication Data
US 2002/0050264 A1 May 2, 2002

(30) Foreign Application Priority Data

Sep. 18, 2000 (DE) .......................................... 100 46 446

(51) Int. Cl.⁷ .............................. F02M 7/00; F02P 5/00
(52) U.S. Cl. ............. 123/295; 123/406.23; 123/406.24; 123/436
(58) Field of Search ........................ 123/198 F, 406.23, 123/406.24, 436, 481, 295, 305

(56) References Cited

U.S. PATENT DOCUMENTS 5,421,302 A * 6/1995 Livshits et al. ........ 123/339.23
6,237,563 B1 * 5/2001 Froehlich et al. ........... 123/350

FOREIGN PATENT DOCUMENTS

| DE | 43 15 885 | 11/1994 |
| DE | 196 15 542 | 5/1998 |
| DE | 198 03 387 | 3/1999 |
| DE | 198 07 124 | 9/1999 |

* cited by examiner

Primary Examiner—Bibhu Mohanty
(74) Attorney, Agent, or Firm—Klaus J. Bach

(57) ABSTRACT

In a method for controlling an internal combustion engine by means of interventions in at least one manipulated variable of the internal combustion engine, a setpoint torque or work which is to be performed is determined at the crankshaft of the internal combustion engine, wherein, with respect to a first variable as work which is to be performed or a setpoint torque to be provided, a corresponding setpoint quantity of heat is determined taking into account the instantaneous actual efficiency, with respect to which at least one associated manipulated variable is set in accordance with the value of the set-point quantity of heat, and, for precise setting of the torque, the actual quantity of heat also being sensed, a setpoint efficiency being determined from the actual quantity of heat taking into account work which is to be performed or a setpoint torque which is to be provided, this can correspond to the first variable or to another variable which is formed as a setpoint torque or work which is to be performed at the crankshaft, and at least one manipulated variable of the internal combustion engine is set approximately simultaneously in accordance with a setting of the setpoint efficiency.

9 Claims, 10 Drawing Sheets

FIG. 13

METHOD FOR CONTROLLING AN INTERNAL COMBUSTION ENGINE

The invention relates to a method for controlling an internal combustion engine with interventions in at least one manipulated variable.

BACKGROUND OF THE INVENTION

In the context of controlling internal combustion engines it is known to determine a setpoint torque which is to be generated by the internal combustion engine. Various manipulated variables of the internal combustion engine can be set in combination in such a way that the setpoint torque is generated in the steady-state condition.

In this context, reference is made, as prior art, by way of example to DE 198 03 387 C1 from which it is known to assign priorities to various torque requirements in such a way that ultimately a setpoint torque is determined which is then to be set. These various torque requirements relate, on one hand, to a desired torque determined by the driver of the vehicle and to setpoint torques which are predefined by subsystems. These subsystems can be, for example, a control for controlling distances from other vehicles, a cruise control, a controller for vehicle movement dynamics and/or a transmission controller.

DE 198 07 124 A1 discloses how a standard interface is provided to the effect that a setpoint for the internal combustion engine is predefined centrally. Furthermore, various procedures are described in said document which describe interventions in manipulated variables of the internal combustion engine during which the setpoint torque can be set with different speeds. For example, a setting of the setpoint torque which is optimized with respect to the efficiency of the internal combustion engine is made by setting the load. Furthermore, alternatively or additionally the ignition angle can be adjusted if, for example, the setpoint torque is to be set quickly.

DE 43 15 885 C1 and DE 196 15 542 C2 disclose various procedures for generating torques which are determined by defined interventions in the manipulated variables of the internal combustion engine.

It is the object of the present invention to provide a method of controlling an internal combustion engine by which the torque to be generated by the internal combustion engine can be set as precisely as possible.

SUMMARY OF THE INVENTION

In a method for controlling an internal combustion engine by means of interventions in at least one manipulated variable of the internal combustion engine, a setpoint torque or work which is to be performed is determined at the crankshaft of the internal combustion engine, wherein, with respect to a first variable as work which is to be performed or a setpoint torque to be provided, a corresponding setpoint quantity of heat is determined taking into account the instantaneous actual efficiency, with respect to which at least one associated manipulated variable is set in accordance with the value of the set-point quantity of heat, and, for precise setting of the torque, the actual quantity of heat also being sensed, a setpoint efficiency being determined from the actual quantity of heat taking into account work which is to be performed or a setpoint torque which is to be provided, this can correspond to the first variable or to another variable which is formed as a setpoint torque or work which is to be performed at the crankshaft, and at least one manipulated variable of the internal combustion engine is set approximately simultaneously in accordance with a setting of the setpoint efficiency.

When controlling the internal combustion engine, it is not necessary to provide an absolutely precise setting of the torque under all operating conditions. Instead, by using the method according to the invention, it is possible to perform an exact setting under certain operating conditions under which a predefined torque is to be set in a precise way. This relates, for example, to torque values required by safety-critical systems such as a traction controller or operating conditions such as torque switching. It is then possible to provide a rapid and precise setting of the correct torque by intervening in at least one manipulated variable which influences the efficiency. In a direct-injection engine or a diesel engine, such a rapid and precise setting of the torque can also be performed by means of the supplied quantity of heat in the form of the amount of fuel supplied. If a torque which has been defined by the driver is to be set, it is also possible to tolerate deviations within certain limits so that during the control an optimum efficiency can then be set in order to optimize emissions and/or save fuel.

The manipulated variable may be set in the next working cycle or, if appropriate, even in the current working cycle.

The procedure is therefore based, during the precise setting of the torque, on determining, in one working cycle, the work which is to be performed at the crankshaft (the setpoint torque). The setpoint quantity of heat for this working cycle is determined in accordance with the current efficiency which results from the setting of the manipulated variables of the internal combustion engine in this working cycle. This setpoint quantity of heat can be set by means of corresponding manipulated variables such as the volumetric efficiency (during homogeneous operation in a spark ignition engine) or the quantity of fuel injected (in stratified charge mode, in a diesel engine or a spark ignition engine). Furthermore, the actual quantity of heat is sensed. As a result, a possible deviation can be detected.

Settings of manipulated variables which influence the efficiency are then obtained by virtue of the fact that a setpoint efficiency is determined from the actual quantity of heat and from the work which is to be performed. This setpoint efficiency can then be set approximately simultaneously by means of a manipulated variable or an interaction between a plurality of manipulated variables. For example, the ignition time can be adjusted in order to limit the efficiency, or the valve control can be varied. It is also possible here to initiate an intervention in the manipulated variables with an intervention in the setting of the ignition time because this manipulated variable can be influenced on a short-term basis. The intervention in this manipulated variable can then be combined with an intervention in the valve control. The setting of the valve control cannot be influenced in such a short-term fashion as the setting of the ignition time. A combined intervention can, for example, give the appearance that interventions have been carried out both in the setting of the ignition time and in the setting of the valve control. As the influence of the intervention in the valve control increases, the adjustment of the ignition time can be reversed when the intervention in the valve control appears to take effect, taking into account the system setting times.

The first variable can in turn be used in the calculation of the setpoint efficiency, as it is explained, for example, below in conjunction with the switching of operating modes such as, for example, a cylinder shut off or a change from stratified charge mode into homogeneous mode in a direct-injection spark ignition engine. However, a different variable can also be used, which is likewise determined as the setpoint torque or work which is to be performed at the crankshaft, as is explained, for example, below in conjunction with the setting of a reserve torque in which the setpoint quantity of the heat, which is set is increased in comparison with the setpoint torque, which is to be set at a given time, and is "corrected" by means of a corresponding setting of the efficiency, in order to obtain a better setting speed when a relatively large torque change is desired.

The work which is to be performed at the crankshaft can be determined taking into account various influencing factors. It is possible, for example, to take into account torque requirements of assemblies of the internal combustion engine. Furthermore, inert masses of the internal combustion engine itself can also be taken into account. Furthermore, the driver's request with respect to a possible acceleration or deceleration is also included. Further requirements, which are predefined, for example, by the control of an automatic gearbox, by a traction controller, by a controller for vehicle movement dynamics etc., can be superimposed on this driver's request.

As has already been described, it is also possible to perform a precise setting of the torque by setting manipulated variables which influence the efficiency only if the operating mode or the combustion method is to be switched or if a torque value required by a safety-control system, such as a traction controller or a controller for vehicle movement dynamics, has been defined.

In this control, guide variables which can be determined on each internal combustion engine irrespective of its operating mode are advantageously used. These are in this case the quantity of heat, in which case one or more further manipulated variables which influence the efficiency and can thus lead to a rapid setting of a precise torque are present. It is therefore in particular not necessary to provide different control methods as a function of operating modes or internal combustion engines used. Instead, it is possible to integrate various internal combustion engines in various operating modes into this control in a modular fashion. As a result, it is also possible to avoid problems which relate to jumps in torque if, for example, different operating methods have to be used in different operating modes and said operating methods possibly lead to instabilities in the transition range.

If the intake work of the cylinder in the intake period in the respective working cycle, the compression work of the cylinder in the compression period in the respective working cycle, the combustion work of the cylinder in the combustion period in the respective working cycle and the expulsion work of the cylinder in the expulsion period in the respective working cycle are taken into account in the respective working cycle during the determination of the work to be performed at the crankshaft, the work performed at the crankshaft can be determined even under unsteady-state conditions in synchronism with the working cycle. An exemplary embodiment of the implementation is explained in conjunction with the figures.

Also, a control error of the induced torque at the crankshaft may be derived from a deviation of the rotational speed of the crankshaft from a setpoint rotational speed, this control error being taken into account in the determination of the setpoint torque or the work which is to be performed at the crankshaft.

This configuration advantageously provides the possibility of providing a central comfort manager with which jumps in the rotational speed and a jolting driving characteristic brought about by this can be compensated as quickly as possible, it is possible to intervene in manipulated variables of the internal combustion engine approximately simultaneously, with an appropriate correction.

It is possible to draw conclusions as to the necessary change in the induced torque from the inertia moment from an energy balance of the rotation energy. The control comfort can be significantly improved by appropriately taking into account this variable.

When it is necessary to change the intake manifold pressure during ongoing operation of the internal combustion engine, the change in the setting of the throttle valve is increased by a precise absolute value and for such a period of time that the increase in the setting of the throttle valve corresponds approximately to the air mass flow rate which is required to set the internal combustion engine to the new load state.

It proves advantageous here that the setting of the new load state takes place significantly more quickly by virtue of the fact that the increased actuation of the throttle valve shortens the transient response to the new load state. This takes place because, the throttle valve is opened further in the time period of the transition than corresponds to the new load state when there is a transition to a state with a relatively large load.

This can be carried out, for example, by using a model, which places the intake manifold pressure, the temperature and the volume in relationship with the masses of the gases, is used to estimate, by reference to the ideal gas equation, which change in the mass over time is required for a specific change in the intake manifold pressure over time. In accordance with this change in the mass over time, it is then possible to calculate which adjustment of the throttle valve is necessary.

The dynamics during the setting of changing load states of the internal combustion engine are therefore advantageously improved by the use of the present invention.

The method can, for example, be used in an internal combustion engine with cylinders which can be shut off. During the shutting off of the cylinders, the gas exchange is prevented because the input and output valves are not actuated. When the cylinders which can be shut off are returned to operation, i.e. at the resumption of the actuation of the input and output valves, it is possible to set rapidly the new load states using the present invention.

When it is necessary to change the intake manifold pressure during ongoing operation of the internal combustion engine, a time profile of the throttle valve setting is determined in such a way that the new intake manifold pressure is set in a way which is optimized with respect to time on the basis of the time profile of the mass flow rate which is set as a result of the throttle valve setting.

The time profile of the throttle valve setting can advantageously be determined in such a way that the mass flow rate resulting from the extreme settings of the throttle valve (opened or closed to a maximum extent) is determined on the basis of said extreme settings. As already pointed out, it is also possible to determine from the air mass flow rate demand, which is required, for example, in the case of a relatively large load, and from the resulting mass flow rate, the period of time in which the throttle valve has to be opened to a maximum extent in order to obtain the change in the load state of the internal combustion engine in an optimal way with respect to time. The throttle valve is then actuated in such a way that, at the start of the transition to the state with a larger load, the throttle valve is opened to a maximum extent for the specific period of time. The throttle valve is then set to the value which corresponds to the required mass flow rate for the new load state in steady-state operational mode. The actuation of the throttle valve is then carried out by means of a jump function. Analogously, when the internal combustion engine is to be set, to provide a low load the period of time for which the throttle valve has to be closed can be determined so as to obtain the optimal state for a relatively low load of the internal combustion engine. It is however necessary to retain an air mass flow. The time period can be obtained by determining the mass flow rate at a throttle valve setting which corresponds to the new load state. The time period during which the throttle valve has to be closed is obtained on the basis of the air mass to be retained and the mass flow rate which is determined.

A particularly rapid setting of changed load states can advantageously be brought about by means of this configuration of the method.

In a particular embodiment of the method according to the invention, a time profile of the anticipated value of the mass flow rate which is set or of the intake manifold pressure which is set is determined on the basis of the time profile of the throttle valve setting, the actual value of the mass flow rate or of the intake manifold pressure is determined, and when there is a deviation of the actual value from the associated anticipated value, the throttle valve is actuated in order to eliminate the deviation.

As a result, it is possible to sense by means of a control, whether the desired time profile of the intake manifold pressure or the mass volumetric efficiency is set on the basis of the actuation of the throttle valve. If this is not the case, the manipulated variable (setting of the throttle valve) can be correspondingly changed. If the throttle valve is already actuated to a maximum extent, i.e. either entirely opened or entirely closed, it is possible, for example, to correspondingly correct the time period during which this maximum actuation of the throttle valve takes place. As a result, the setting precision during a dynamically rapidly occurring change in the load state is improved further. The corresponding variables can either be measured directly or derived on the basis of a model by reference to other measurement variables.

It is possible that individual cylinders of the internal combustion engine are shut off in that, in a first step, it is tested whether the calculated mass volumetric efficiency can be set appropriately for operation with a reduced number of cylinders. In a further step, a throttle valve is actuated in such a way that the intake manifold pressure corresponds to the mass volumetric efficiency with a reduced number of cylinders. During this step, the torque at the crankshaft is set in a fashion synchronized from one working cycle to the next by an intervention in manipulated variables which influence the efficiency, the cylinders being shut off when the corresponding intake manifold pressure is reached.

As a result, it is possible for the torque-generating parameters to be switched without jumps in the torque. During the intervention in the ignition or the quantity of fuel injected, this intervention can take place in such a way that exhaust gas regulations are complied with. Here, it is possible, for example, to actuate individual cylinders differently in order to obtain better exhaust gas values in a mixed mode than when the cylinders are actuated uniformly. The jump in the torque can be avoided by setting that the intake manifold pressure, which can be set only with a certain degree of inertia, to the new value before the switching operation. During this setting of the intake manifold pressure to the new value, the torque can be set by the intervention in the manipulated variables which influence the efficiency, for example, the ignition and/or the quantity of fuel, with the result that an undesired jump in the torque does not occur because the mass volumetric efficiency has already approached the conditions which are adapted to the time after the switching operation, while the internal combustion engine is still operated with the full number of cylinders. As a result of the intervention in the manipulated variables which influence the efficiency, it is possible to adapt torque flexibly in a synchronized fashion from one working cycle to the next with rapidly set-table manipulated variables with short time constants.

The setting of the throttle value can advantageously be carried out so that the switching process can again be shortened by the new intake manifold pressure which is set more rapidly. A rotational speed correction can also be carried out as mentioned earlier.

Cylinders, which have been shut off, are connected by virtue of the fact that the throttle valve is actuated in such a way that the intake manifold pressure corresponds to the mass volumetric efficiency with the full number of cylinders. The cylinders, which have been shut off, are connected simultaneously and the torque at the crankshaft is set in a synchronized fashion from one working cycle to the next at the crankshaft by means of an intervention in manipulated variables which influence the efficiency.

This method corresponds to the inverse conditions. Here, the mass volumetric efficiency is adapted before the switching operation with a reduced number of cylinders so that an increased torque is produced during the switching to the operation with a full number of cylinders. This torque can in turn be reduced in a synchronized fashion from one working cycle to the next in that an intervention is made in the manipulated variables which influence the efficiency, for example therefore an intervention in the ignition and/or the quantity of fuel, with the result that no jump in the torque occurs in the switching phase. This switching phase lasts until the intake manifold pressure is set to the mass volumetric efficiency with a full number of cylinders by a corresponding setting of the throttle valve.

If appropriate, when shut-off cylinders are switched on again, it is also possible to take into account deviations in the mass volumetric efficiency of the shut-off cylinders owing to the lack of gas dynamics in the intake manifold when they are switched on again. Likewise, differences in the indexed high-pressure efficiency at the transition can be taken into account.

If the internal combustion engine is a direct-injection spark ignition engine for switching over from the stratified charge into the homogeneous mode, and vice versa, at least one pattern is stored in a control unit in which the torques which are to be set in each working cycle during the switching process are stored, and in which case the switching time is defined by reference to the torques in the respective pattern which are to be set, in such a way that the torques can be set during the switching process by means of permitted interventions in manipulated variables which influence the efficiency.

During a switching operation of a direct-injection spark ignition engine from the stratified charge mode into the homogenous mode, and vice-versa, the corresponding change in the compression and expansion work during the determination of the intervention in the manipulated variables with the aim of achieving a constant torque is taken into account in each working cycle at the change-over of the operating mode. It is checked, by reference to the prevailing conditions and the stored patterns for switching processes, when the switching point is to be selected so that intervention in the manipulated variables of the internal combustion engine occurs only in a permissible fashion. The permissibility of this intervention in the manipulated variables of the internal combustion engine can be defined, for example, in such a way that reliable engine operation has to be ensured. Furthermore, interventions which lead to unacceptable gas values can be avoided. In this method, a jump in the torque is therefore primarily avoided. In addition to avoiding this jump in the torque, further criteria can be taken into. The manipulated variables which influence the efficiency can, for example, be again the ignition time and/or the quantity of fuel.

An exemplary embodiment of the invention will be described below on the basis of the accompanying drawings.

BRIEF DESCRIPTION OF THE DRAWINGS

FIGS. 11–13 show the conditions during a switching operation between the stratified charge mode and the homogeneous mode of a direct-injection spark ignition engine.

DESCRPTION OS PARTICULAR EMBODIMENTS

Figure 1:
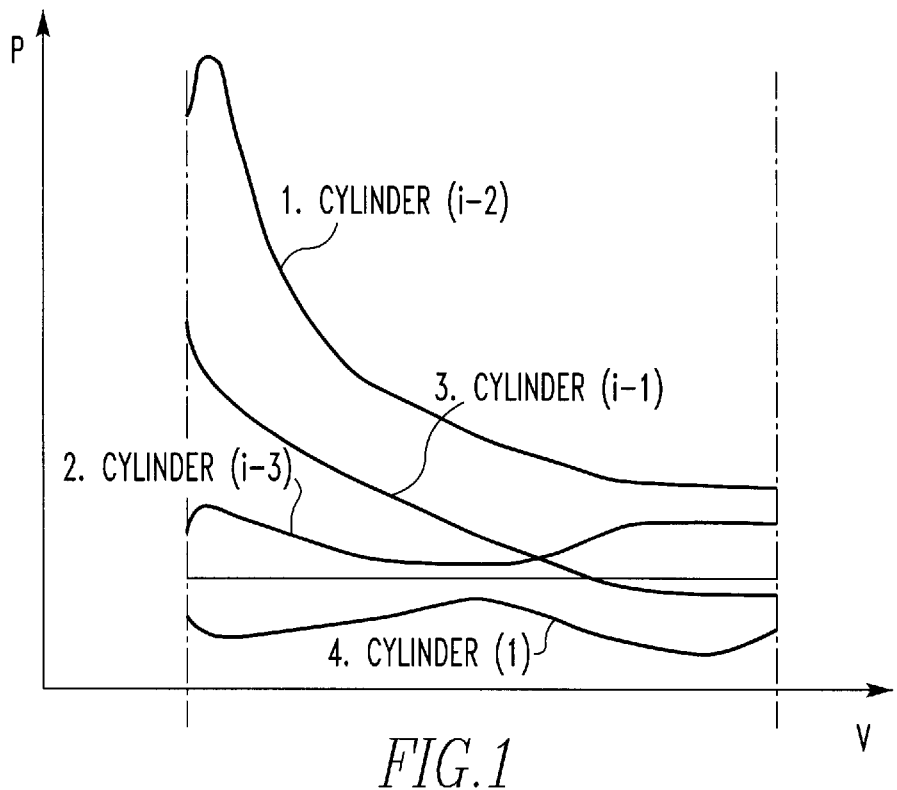
FIG. 1 is a diagram of the cylinder pressure plotted against the displacement in a 4-cylinder engine as indicator diagram over one working cycle, composed of the components of the respective cylinders.

FIG. 1 is indicator diagram of a 4-cylinder engine in which the pressure conditions in the respective cylinders are plotted the displacement for one working cycle. In each working cycle, a complete indicator diagram takes place. Under non-steady-state conditions, the portions of the individual cylinders on the indicator diagram may differ with respect to the intake time, working time and expulsion time owing to different conditions. For this reason, the respective intake, compression, combustion and displacement work are preferably determined individually for each working cycle in order, to derive manipulated variables for approximately simultaneous setting of a precise torque. These manipulated variables are the efficiency-influencing manipulated variables of the cylinder which is in the working state at a given time. In the case of a direct-injection or a diesel engine, the quantity of heat can also be varied by means of the quantity of fuel supplied. The manipulated variables can be derived during an approximately simultaneous determination in such a way that, by influencing the manipulated variables, the torque can be adapted in the next working cycle or, under certain circumstances, even in the current working cycle so that a precise torque can be set as rapidly as possible.

In FIG. 1, the current working cycle is referred to by the index "i". The indices (i–1), (i–2), (i–3) relate to the respective preceding working cycles. FIG. 1 shows the part of the curve for the cylinder 4 which corresponds to the intake period. At the right-hand end of the curve, the inlet valves are closed. From knowledge of the quantity of air taken in when the inlet valves are closed, it is then possible to determine the respective working portions in the following working cycles. In particular the compression work which is to be determined in the following working cycle is determined by the quantity of air taken in. In the subsequent working cycle, the expansion work can, for example, still be influenced by an intervention in the manipulated variables which influence the efficiency. In a direct-injection engine or a diesel engine, the quantity of heat can be varied by means of the quantity of fuel supplied. Here, there is another possible way of intervening in order to set a specific torque. The expulsion work is also determined on the basis of the quantity supplied and the sequence of the combustion process.

This means therefore that the information on the quantity which is supplied to the individual cylinders is used during the closing of the inlet valves in order to determine subsequently the corresponding working portions of this cylinder in the respective working cycle.

This determination can, as explained below, be made by means of a model. However, it is also possible to determine the above by means of characteristic curves or characteristic diagrams or even by means of a charge exchange calculation.

Figure 2A:
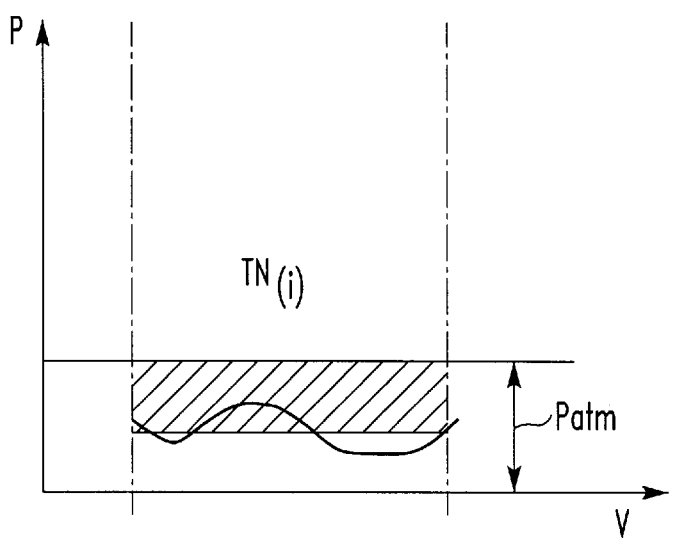
FIG. 2a is a diagram of the cylinder pressure plotted against the displacement from which the intake work can be determined.

FIG. 2a shows a diagram in which the intake work in one working cycle $TN_{(i)}$ is explained. The pressure in the cylinder is plotted again against the displacement. The atmospheric pressure (ambient pressure) is designated by $P_{atm}$. The average pressure in the intake period $p_{msaug(i)}$ is obtained as:

$$p_{msaug(i)} = (p_{atm} - p_{saug(i)}) * m + p_{msaugrest}$$

This will be explained in detail once more in conjunction with FIG. 5.

Figure 2B:
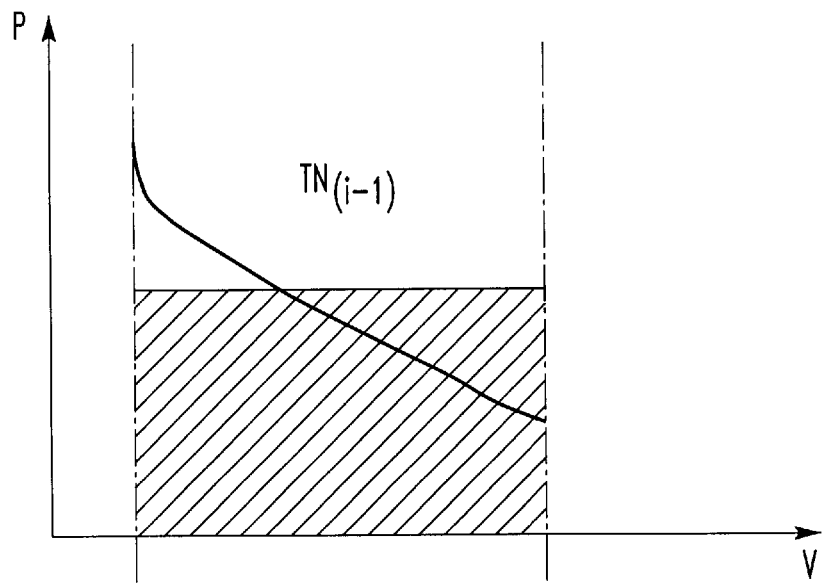
FIG. 2b is a diagram of the cylinder pressure plotted against the displacement from which the compression work can be determined.

FIG. 2b shows a diagram in which the compression work is explained. The pressure in the cylinder is plotted again against the displacement. The average pressure in the compression period is obtained as $$P_{mkomp(i-1)} = \frac{p_1 * V_1}{(K-1) * V_{Displ}} * ((V_1/V_k)^{k-1} - 1)$$

In the overall balance, precise knowledge of the variable K is not necessary because in the case of the combustion work, the compression work with the variable K is subtracted or added again. Although this is the compression work of another cylinder, it has become apparent that inaccuracies in the variable K have a negligible influence on the difference between these compression work values.

Figure 2C:
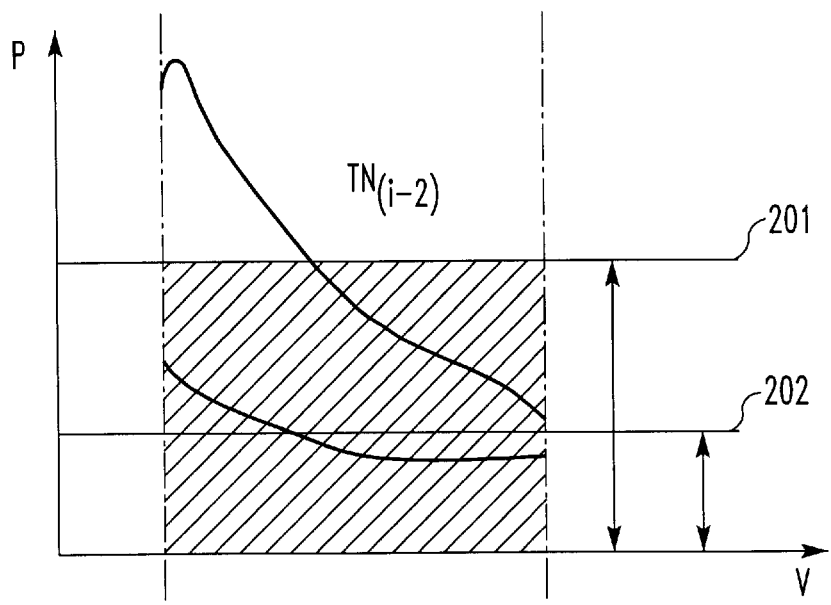
FIG. 2c is a diagram of the cylinder pressure plotted against the displacement from which the combustion work can be determined.

FIG. 2c shows a diagram in which the combustion work is explained. The index "I" is used to refer to the current working cycle. The pressure in the cylinder is again plotted against the displacement. The average combustion pressure $p_{mverb(i-2)}$ is obtained as:

$$p_{mverb(i-2)} = p_{mkomp(i-2)} + p_{miHD(i-2)}$$

The average induced high pressure $p_{miHD(i-2)}$ resulting from the combustion process can be determined as a function of the mass volumetric efficiency and the ignition time on a test bed. The area between the expansion curve and the compression curve is obtained on the test bed. In order to obtain the area under the expansion curve, the compression work must be added again.

The average combustion pressure $p_{mverb(i-2)}$ over 180° CA is designated in FIG. 2c by the reference numeral 201, and the average combustion pressure over 180° CA is designated in FIG. 2c by the reference numeral 202.

Figure 2D:
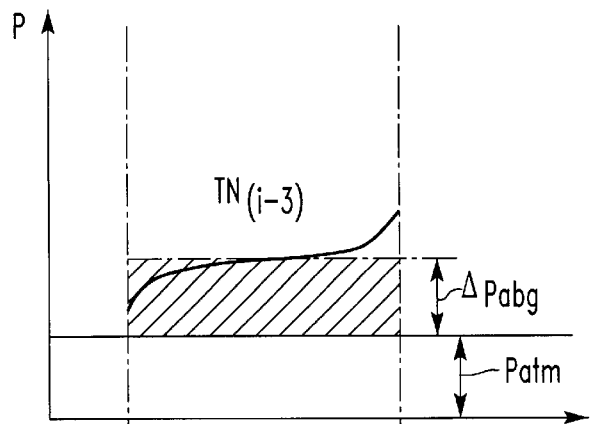
FIG. 2d is a diagram of the cylinder pressure plotted against the displacement from which the expulsion work can be determined.

FIG. 2d is a diagram in which the expulsion work is explained. The pressure in the cylinder is plotted again over the displacement. The average pressure in the expulsion period $p_{maus(i-3)}$ is obtained as:

$$p_{maus(i-3)} = p_{abg} * b + p_{mausrest}$$

Here, $p_{abg}$ is the pressure in the exhaust pipe, which acts as a counter pressure with respect to the expulsion work. As will be explained later in relation to FIG. 6, the average pressure in the expulsion period is obtained from this as:

$$p_{maus(i-3)} = (TL_{(i-3)})^2 * d * b + p_{mausrest}$$

The variable TL designates here the mass volumetric efficiency, and the values d and b are constants.

In the present explanation, the portions of the individual cylinders have been described by means of a model so that these portions can be represented analytically.

However, the essential feature is to a lesser extent the precise manner of determining the individual portions but rather the determination of these portions in synchronism with the working cycle. The portions can also be determined, for example, by means of characteristic diagrams.

FIGS. 3a to 3d show the relationships in an eight-cylinder engine. It is to be noted here that a working cycle corresponds to one rotation of the crankshaft through 90°.

Figure 3A:
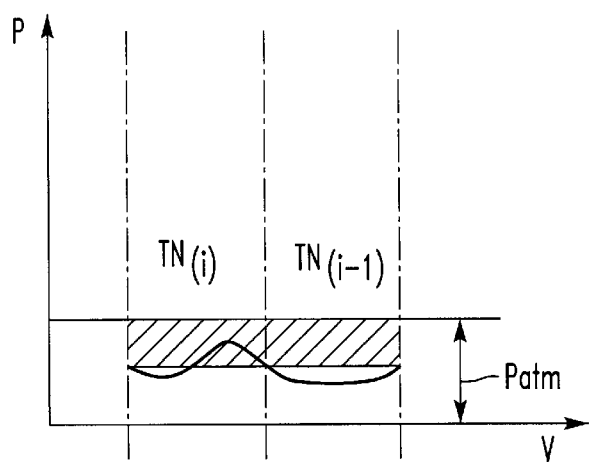
FIGS. 3a to 3d show the corresponding conditions in an 8-cylinder engine.
Figure 3B:
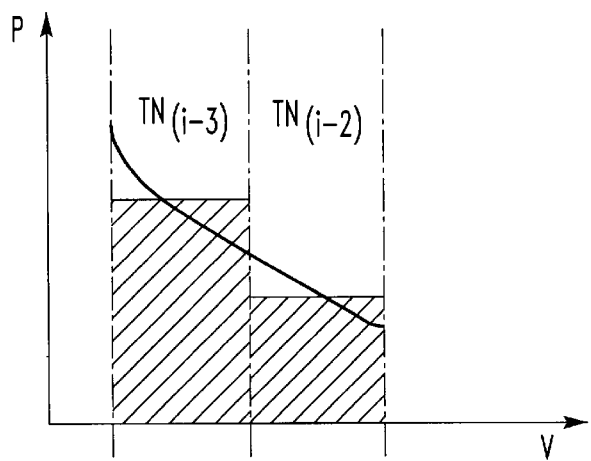
Figure 3C:
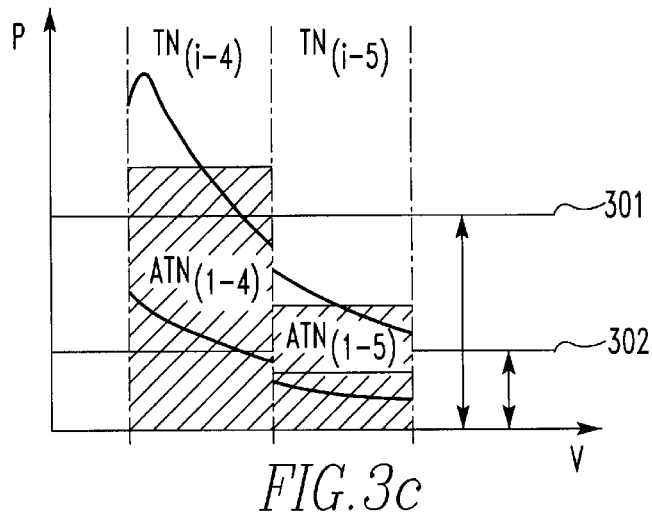
Figure 3D:
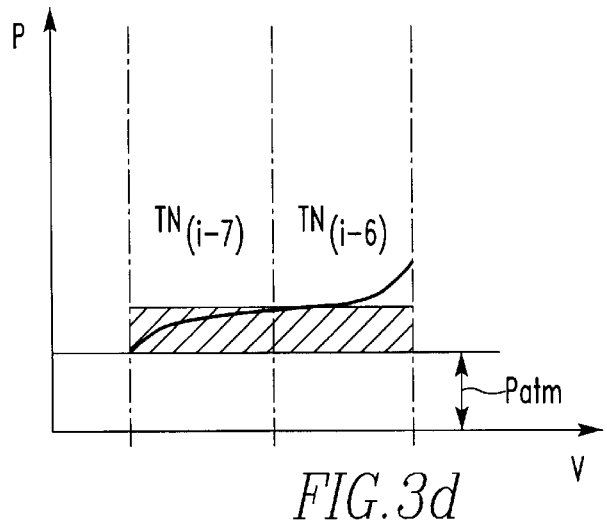

In FIG. 3c—in a way comparable to the relationships in FIG. 2c—the average combustion pressure over 180° CA is designated by the reference numeral 301, and the average compression pressure over 180° CA is designated by the reference numeral 302. The average combustion pressure is obtained as:

$$\text{Average combustion pressure} = (ATN_{(i-4)} + ATN_{(i-5)})/2$$

The variable ATN is the work averaged over the crank angle in question. In an eight-cylinder engine, $ATN_{(i-4)}$ is the expansion work averaged over the first 90° crank angles for the cylinder which is at the start of the working cycle. The variable $ATN_{(i-5)}$ is the expansion work averaged over the second 90° crank angles for the cylinder which is in the second part of the working cycle. The variable $ATN_{(i-4)}/ATN_{(i-5)}$ can be represented as a function of the center of gravity and the compression work. The hatched area in FIG. 3c is designated in each case by the designation "ATN".

Figure 4:
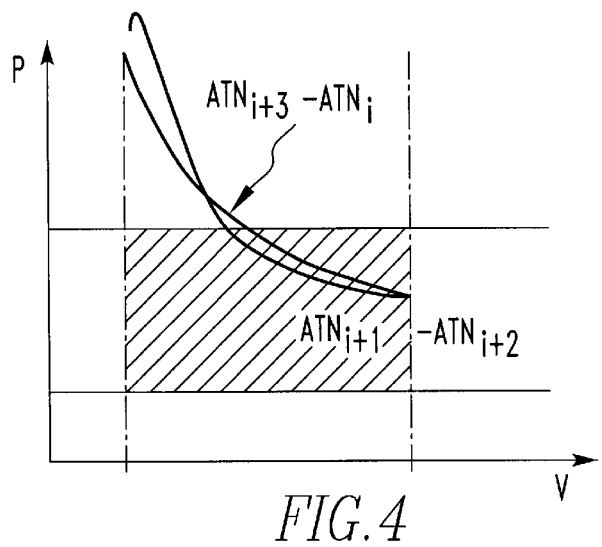
FIG. 4 shows the conditions when a cylinder/cylinders is/are shut off.

FIG. 4 shows the special case of the shutting off of a cylinder. Here, the outlet valve does not open after combustion has taken place. The "inverse" combustion average pressure is designated by the reference number 401. The relationship:

$$ATN_{(i)} + ATN_{(i+1)} = ATN_{(i+3)} + ATN_{(i+2)}$$

applies.

Assuming an isoentropic compression, the compression work is equal to the combustion work under optimum conditions when the inlet and outlet valves are closed.

Figure 5:
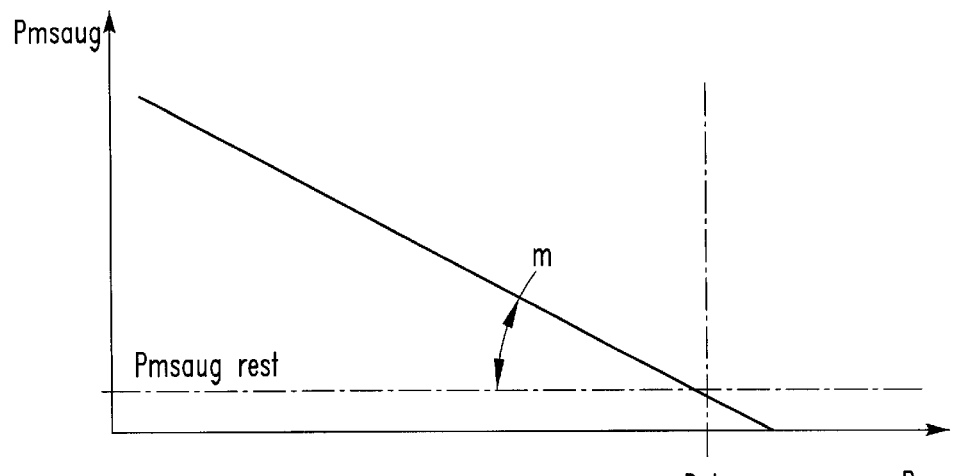
FIG. 5 shows a diagram for determining the intake work.

FIG. 5 shows a diagram for explaining in more detail the determination of the intake work. The average pressure in the intake period can be represented as a function of $\Delta p_{saug}$. The corresponding data can be taken from the charge exchange calculation. Assuming a constant engine speed, the following applies, for example:

$$p_{meaug} = (p_{atm} - p_{saug}) * m + p_{msaugrest}$$

The corresponding variables of this equation are illustrated in the diagram in FIG. 5.

Figure 6:
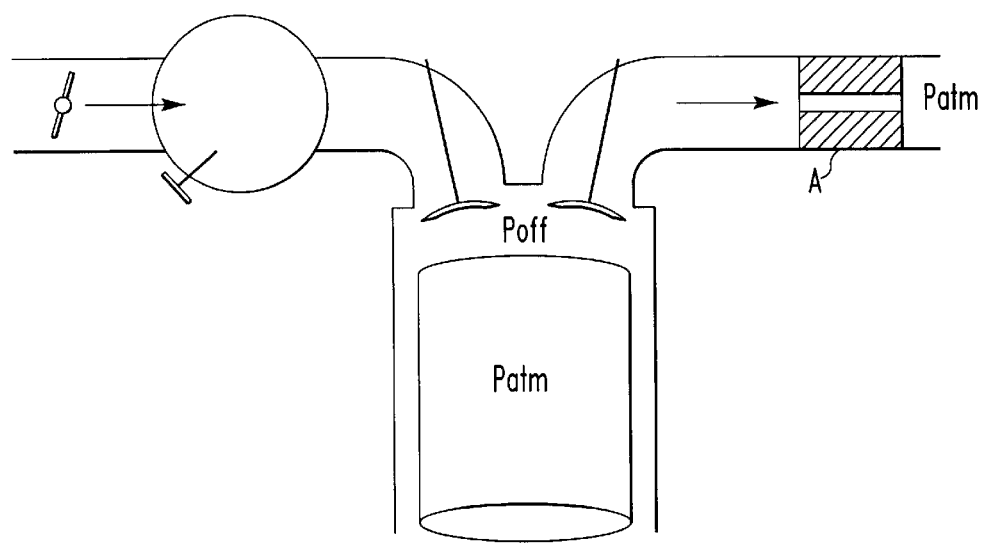
FIG. 6 shows a diagram for determining the expulsion work.

FIG. 6 shows a diagram for further explaining the expulsion work. The average pressure in the expulsion period can be represented as a function of the mass volumetric efficiency TL, the exhaust gas temperature Tabg, the engine speed Nmot and the passage area A in the exhaust gas tract. Assuming a constant engine rotational speed, the following applies:

$$p_{maus} = p_{abg} * d + p_{mausrest}$$

$$p_{abg} = (TL)^2 * b$$

The variables d and b are constants here.

The overall gas change work can then be represented, by reference to the average pressures on the basis of the intake work and the expulsion work, as follows:

$$p_{mLW} = ((p_{atm} - p_{saug}) * m + p_{msaugrest}) + ((TL)^2 * d * b + p_{mausrest})$$

Figure 7:
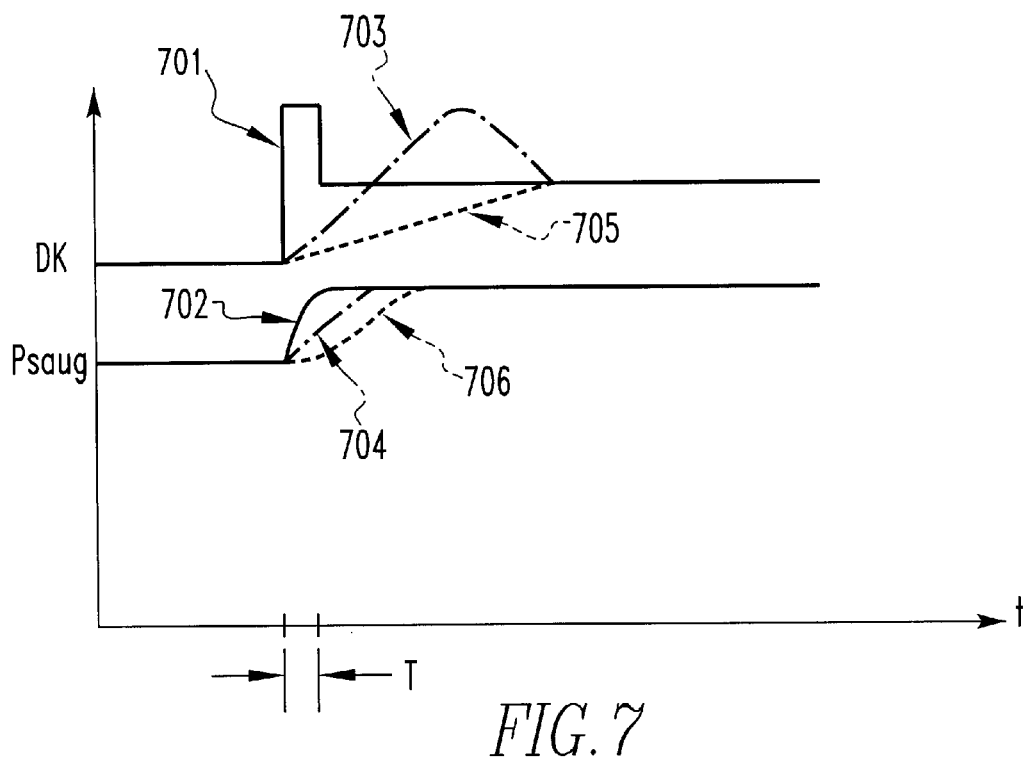
FIG. 7 shows the time profile of the setting of the throttle valve and of the intake manifold pressure which is set.

FIG. 7 shows a representation of the time profile of the setting of the throttle valve and of the intake manifold pressure which is set. Various time profiles of throttle valve settings DK are represented (701, 703 and 705). The time profiles of the intake manifold pressure $p_{saug}$ (702, 704 and 706) are respectively set.

It is apparent here that the static end state of the intake manifold pressure is reached most quickly (curve 702) given a time profile of the throttle valve setting corresponding to curve 701. The time period T during which the throttle valve is open to a maximum extent is determined as explained in the introduction to the description. It is also apparent that the end state of the intake manifold pressure is reached correspondingly more slowly (curve 704 and 706) given an adjustment of the throttle valve in accordance with curves 703 and 705.

Figure 8:
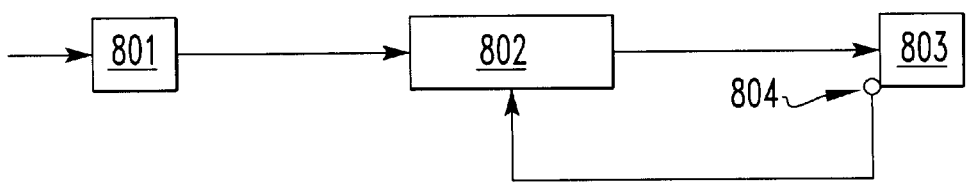
FIG. 8 shows function blocks explaining the method.

In the function blocks shown in FIG. 8, a changed setting of the throttle valve in the steady-state condition in block 801 is derived on the basis of the request of a changed load state of the internal combustion engine 803, in order to be able to set the load state of the internal combustion engine.

In the block 802, an actuation of the throttle valve is determined in order to be able to set the change in the load state as quickly as possible. A corresponding signal is output to the throttle valve by this unit 802. In the illustrated example embodiment, a sensor 804 for sensing the intake manifold pressure is located on the internal combustion engine 803.

This signal is in turn fed to the unit 802 in which, in addition to the time profile of the actuation of the throttle valve, a time profile of anticipated values of the intake manifold pressure which is set is also determined. The intake manifold pressure which is measured with the sensor 804 can be compared with the corresponding anticipated value, in which case, when there is a deviation, a corresponding change can be made to the actuation of the throttle valve. For example, the time period T of the maximum actuation of the throttle valve can be lengthened or shortened.

Figure 9:
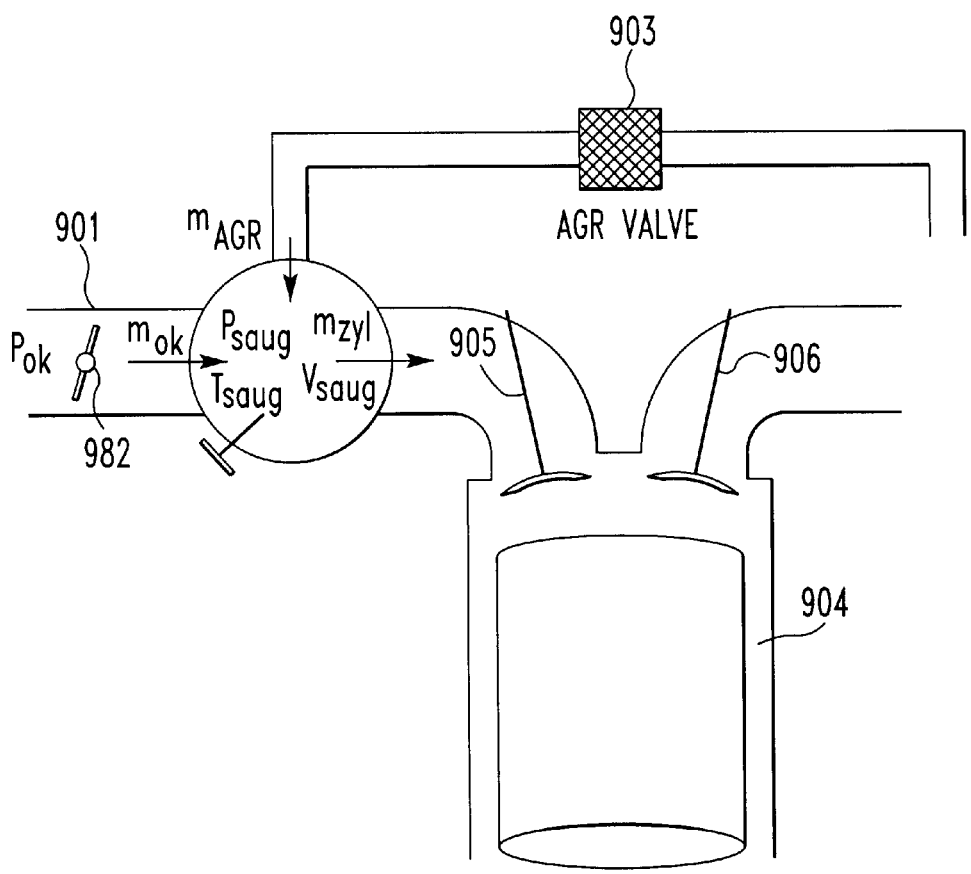
FIG. 9 shows a model for calculating the necessary change in the throttle valve setting in order to achieve a specific change in the intake manifold pressure.

FIG. 9 shows a model which will be explained below. An intake manifold 901 with a throttle valve 902 is shown. Furthermore a branch of an exhaust gas feedback line (AGR) is shown in which in turn a valve 903 is provided. Furthermore, a cylinder 904 is shown with an inlet valve 905 and an outlet valve 906.

The intake manifold pressure $p_{saug}$ can be represented by means of the ideal gas equation as a sum of the individual components of the gases which, owing to various effects in the intake manifold 901 with the intake manifold volume $V_{saug}$ are:

$$P_{saug} = \frac{R_g * T_{saug}}{V_{saug}} * \sum_{k}^{flows} m_k$$

This results in:

$$dm_{DK}/dt = \frac{dp_{saug}/dt * V_{saug}}{R_g * T_{saug}} - dm_{AGR}/dt - dm_{TE}/dt - dm_{zyl}/dt$$

with $m_{DK}$ as the mass portion which is located in the intake manifold 901 owing to the throttle valve setting, mAGR as the mass portion which is located in the intake manifold owing to the exhaust gas feedback line, $m_{TE}$ as the mass portion which is to be fed back to the tank vent, and the mass portion in the cylinder as $m_{zyl}$.

In summary, it can be inferred from the above that a rapid change in the intake manifold pressure requires a rapid change in the air mass flow rate by means of the throttle valve. The system setting times of the throttle valve actuator, the intake manifold volume $V_{saug}$, the engine speed and the cylinder volume with its influence on the variable $m_{zyl}$ determine possible intake manifold pressure gradients.

Figure 10:
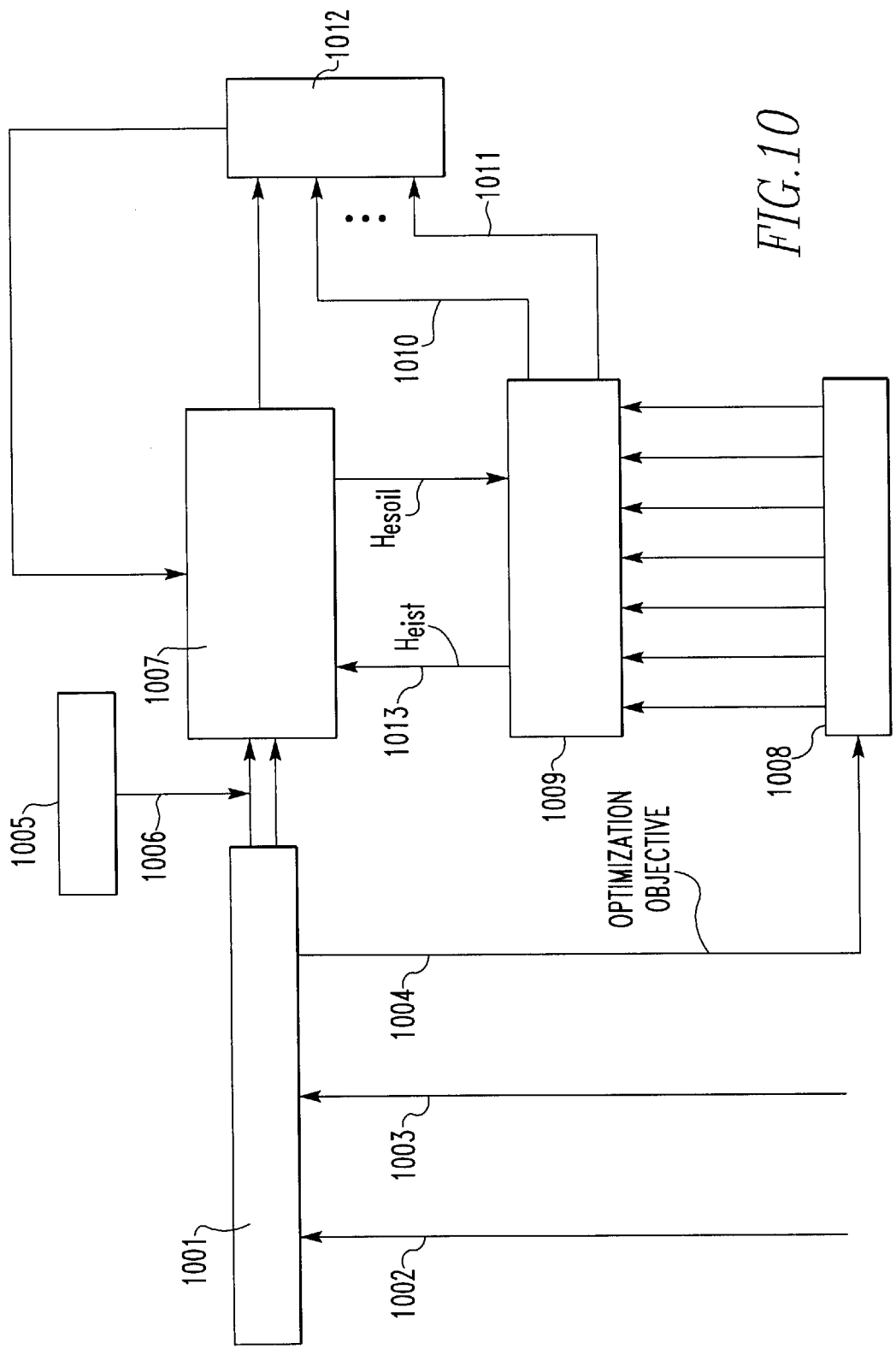
FIG. 10 shows a block diagram explaining the principle of the method according to the invention.

FIG. 10 shows a block diagram explaining the method according to the invention.

In the block 1001, a torque co-ordination takes place. In this torque co-ordination 1001, a plurality of input variables 1002, 1003 are processed. These input variables may be, for example, a signal which represents the driver's request for a specific torque. Likewise, a torque requirement or torque limitation of a traction controller or a controller for vehicle movement dynamics may also be present. This torque limitation is given priority over a driver's request for a higher torque. Furthermore, torques are taken into account which relate to assemblies, such as the power output of a dynamo or an air-conditioning compressor. Likewise, torques are taken into account which occur during the operation of the internal combustion engine in the internal combustion engine itself. These torques have been explained at the beginning in conjunction with FIGS. 1 to 6.

Furthermore, a block 1005 is shown. In this block, a correction variable 1006 can be predefined, at least under certain operating conditions from a deviation of the actual rotational speed from a set point rotational speed, said correction variable 1006 being added to the output of the torque co-ordination 1001. By means of an energy balance it is possible to determine a necessary change in the required torque from the present torque from the moment of inertia with respect to the rotational movement of the rotating parts, in order to be able to compensate this deviation of the actual rotational speed from the set point rotational speed. This change in torque corresponds to the signal 1006.

Work which is to be performed by the crank shaft (effective work at the crank shaft) can already be derived in blocks 1001 and 1005 from the corresponding torques. These signals can, however, also be output as torques. The conversion into mechanical work which is to be performed by the crank shaft then takes place in the block 1007 in which the quantity of heat is calculated.

The effective work at the crank shaft $W_e$ is obtained from the quantity $W_b$ of heat supplied, the centrifugal mass work $W_\Theta$ and the effective efficiency $\eta_e$ as:

$$W_\Theta = W_b * \eta_e - W_\Theta$$

The objective is to suitably set the effective work $W_e$ by means of a suitable intervention in manipulated variables in order to influence $W_b$ and $\eta_e$.

$W_b$ can, for example, be determined and influenced by the injected quantity of fuel in a diesel or a direct-injection spark ignition engine in stratified charge mode by means of the mass volumetric efficiency for a known lambda value in spark ignition engines.

The effective efficiency $\eta_e$ can be described, for example, by means of the following factors:

$$\eta_e = \eta_B * \eta_{th} * \eta_{HD} + \eta_{LW} * \eta_{mech}$$

where:

$\eta_B$: degree of combustion efficiency of the fuel,
$\eta_{th}$: theoretic thermodynamic high-pressure efficiency
$\eta_{HD}$: correction factor for the real high-pressure process
$\eta_{LW}$: charge exchange efficiency
$\eta_{mech}$: mechanical efficiency.

The signal 1004 represents an optimization goal. This optimization goal can comprise, for example, the setting of a precise torque at the crank shaft. Likewise, as optimization goal it is also possible to provide that the ignition time is to be moved in the "retarded" direction for a specific period of time in order to heat the catalytic converter. During normal driving mode, that is to say the conversion of the desired torque predefined by the vehicle driver without being influenced by a system internal to the vehicle, it is possible to predefine an optimum efficiency as the optimization goal. The signal 1004 continues to be fed to an engine control module 1008. A plurality of signals, which represent engine variables relating to efficiency, are output to an efficiency co-ordination means 1009 by this engine control module 1008.

The efficiency co-ordination means 1009 outputs manipulated variables 1010, 1011 to the engine 1012. These manipulated variables correspond to a specific efficiency which is to be set and which is designated as $\eta_{eist}$ for the current working cycle. This efficiency $\eta_{eist}$ is also output to the block 1007 as signal 1013. The set point quantity $W_b$ of heat is determined there by means of this value and the effective work.

The mass volumetric efficiency, for example, of a conventional spark ignition engine is determined in accordance with the set point quantity $W_b$ of heat determined, according to the equation:

$$W_b = TL_{soll} * k$$

If a high degree of torque precision has been predefined as the optimization goal, the actual quantity $Q_{ist}$ of heat can subsequently be sensed. Given a deviation of the actual quantity of heat of the one working cycle from the set point quantity of heat, an intervention in the manipulated variables which influence the efficiency can be made approximately simultaneously. For this purpose, a set point efficiency $\eta_{esoll}$ is determined from the actual quantity $Q_{ist}$ of heat and the effective work at the crank shaft to be set. From this set point efficiency it is then possible to derive efficiency-related manipulated variables which intervene, for example, in the ignition and/or the valve control in order to set the set point efficiency $\eta_{esoll}$. As an alternative to this way of influencing the efficiency, in a direct-injection engine or a diesel engine it is also possible to make an intervention by means of the quantity of fuel supplied.

The effective work can be represented by means of an average pressure $p_{mesoll}$ multiplied by the displacement $V_H$.

From this, the following is obtained as the set point quantity of heat:

$$W_b = \frac{p_{mesoll} * V_H}{\eta_{eist}}$$

Given a deviation of the actual quantity $Q_{ist}$ of heat, the efficiency $\eta_{esoll}$, which is to be set approximately simultaneously, can be represented as follows:

$$\eta_{esoll} = \frac{p_{mesoll} * V_H}{Q_{ist}}$$

Furthermore, the following applies:

$$p_{mesoll} = \frac{TL_{ist} * k * \eta_{iHDsoll}}{V_H} - (p_{mLWist} + p_{mmechist})$$

The average pressure $p_{mLWist}$, which is obtained on the basis of the charge exchange efficiency, and the average pressure $p_{mmechist}$, which is obtained on the basis of the mechanical efficiency, are presumed to be known. The following also applies:

$$Q_{ist} = TL_{ist} * k$$

By insertion the following is obtained:

$$\eta_{esoll} = \frac{TL_{ist} * k * \eta_{iHDsoll} - (p_{mLWist} + p_{mmechist}) * V_H}{TL_{ist} * k}$$

By reformulation, the following is obtained for the high-pressure efficiency:

$$\eta_{iHDsoll} = \eta_{esoll} + \frac{(p_{mLWist} + p_{mmechist}) * V_H}{TL_{ist} * k}$$

From this, the corresponding manipulated variables of the internal combustion engine which are to be set approximately simultaneously can be derived. This means that these manipulated variables are set in the next working cycle or, if appropriate, even in the current working cycle.

The calculation explained above results in an intervention in the ignition time of the engine. It is, for example, also possible to coordinate interventions in various manipulated variables, as has been explained at the beginning. The ignition time can be adjusted very quickly. The adjustment of the valve control is possible only with a certain time constant. A co-ordinated adjustment can give the appearance that an adjustment of the ignition time is performed in order to be able to influence the efficiency in as short a term as possible. At the same time, the valve control is varied. Owing to the time constant, this manipulated variable is effective only when decelerated. The adjustment of the ignition time is reversed again as a function of the degree to which this manipulated variable becomes effective. As a result, for example, specific exhaust gas values or consumption values can be optimized. It is therefore possible to make a classification into various efficiency-influencing factors.

With the method described it is, for example, also possible to keep in reserve a "reserve torque" in order to be able to set a torque increase within a short time.

For this purpose, the value of the work to be set is increased. As an equation this is expressed in such a way that when $W_b$ is determined, a pressure ($p_{me}+p_{meres}$) is predefined instead of the average pressure $p_{me}$. Correspondingly, in the exemplary case of a spark ignition engine, a relatively large mass volumetric efficiency is then set. A $Q_{ist}$ is then obtained in accordance with this set increase.

On the other hand, when determining $\eta_{esoll}$, only the effective work is included in the calculation, without the excess ($p_{mesoll}*V_H$).

Because the variable $Q_{ist}$ is increased in comparison with this variable, the efficiency $\eta_{esoll}$ which is to be set is determined at a correspondingly lower level.

This then results in an intervention in the manipulated variables of the internal combustion engine with which this "excessively large" quantity $Q_{ist}$ of heat is limited in relation to the effective work performed.

It is therefore also possible to keep in reserve a "reserve torque" by virtue of the fact that the variable $Q_{ist}$ is set with a correspondingly increased value. As a result of the rapidly responding manipulated variables which influence the efficiency, for example the ignition time, this $Q_{ist}$ can be limited by virtue of the fact that the ignition time is adjusted in the "retarded" direction. If a larger torque is then desired, the variable $Q_{ist}$ is then already at a correspondingly larger value, with the result that the change can be set rapidly by virtue of the fact that the ignition time is moved forward. Possible inertia in the setting of relatively large $Q_{ist}$ can thus be advantageously avoided.

It is apparent that such a reserve torque can also be implemented in other types of internal combustion engines.

When a cylinder is shut off, the number of cylinders connected Zylanz, and the overall number of cylinders, Geszyl, must be taken into account when determining the manipulated variables:

$$\eta_{esoll} = \frac{p_{mesoll} * V_H}{Q_{ist} * Zylanz}$$

In addition the following applies:

$$p_{mesoll} = \frac{TL_{ist} * k * \eta_{iHDsoll} * Zylanz}{V_H} - (Zylanz * p_{mLWist} + Geszyl * p_{mmechist})$$

The average pressure $p_{mLWist}$ which is obtained on the basis of the charge exchange efficiency, and the average pressure $p_{mmechist}$, which is obtained on the basis of the mechanical efficiency, are presumed to be known. In addition the following applies:

$$Q_{istZyl} = TL_{ist} * k_{Zyl}$$

By insertion, the following is obtained:

$$\eta esoll = \frac{TL_{ist} * k * \text{Zylanz} * \eta_{iHDsoll} - (\text{Zylanz} * p_{mLWist} + \text{Geszyl} * p_{mmechist}) * V_H}{TL_{ist} * k * \text{Zylanz}}$$

By reformulation, this yields the following for the high-pressure efficiency:

$$\eta_{iHDsoll} = \eta_{esoll} = \frac{-(\text{Zylanz} * p_{mLWist} + \text{Geszyl} * p_{mmechist}) * V_H}{TL_{ist} * k_{Zyl} * \text{Zylanz}}$$

With the present invention it is also possible to bring about torque-neutral switching of the operating mode in a direct-injection spark ignition engine when there is a change-over from the stratified charge mode of operation into the homogeneous mode.

Because the set point torque or the effective work which is to be performed at a crank shaft is taken into account in each working cycle, both torque-neutral and exhaust-gas-optimized switching of the operating mode can be carried out. During the switching of the operating mode, a constant torque, that is to say the avoidance of jumps in the torque, is given top priority. Furthermore, in terms of the manipulated variables which influence the efficiency of the internal combustion engine, these variables can be set according to further criteria. Thus, it is possible, for example, to define that in a 4-cylinder engine, two cylinders run with a value $\lambda=1$ with a correspondingly retarded ignition angle and the other two cylinders run with a value $\lambda=1.4$ in the transition phase. As a result, on the one hand the required torque can be set. Furthermore, this permits allowance to be made for exhaust-gas regulations. The operation which is optimized in terms of torque can, for example also be ensured if all the cylinders run with a value $\lambda=1.2$. However, this would entail a very high exhaust-gas peak in the $NO_x$ values. By means of a corresponding mixed operation, this operating point can be avoided in terms of the setting of the manipulated variables.

It is clear here that these criteria can be taken into account not only in the setting of a direct-injection spark ignition engine when switching from stratified charge mode into the homogeneous mode. Corresponding criteria can also be used generally in the method under other conditions in order, in addition to setting the set point torque or the work which is to be performed, to be able to take into account other criteria in the setting of the corresponding manipulated variables of the internal combustion engine which influence the efficiency. These criteria can relate to compliance with exhaust gas regulations.

Figure 11:
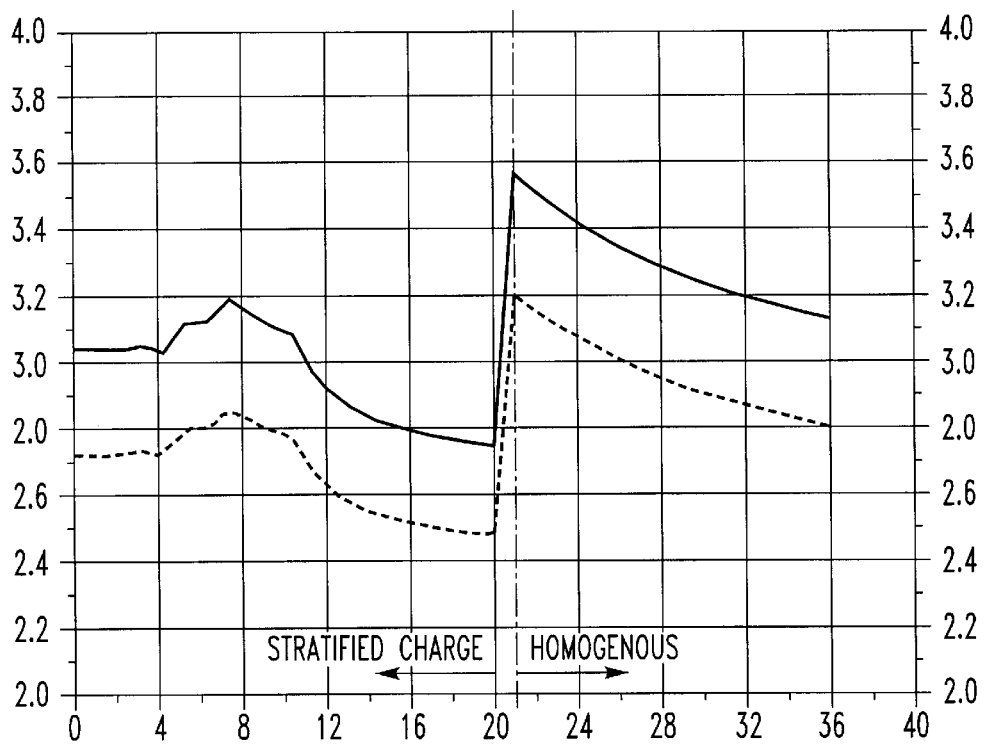
Figure 13:
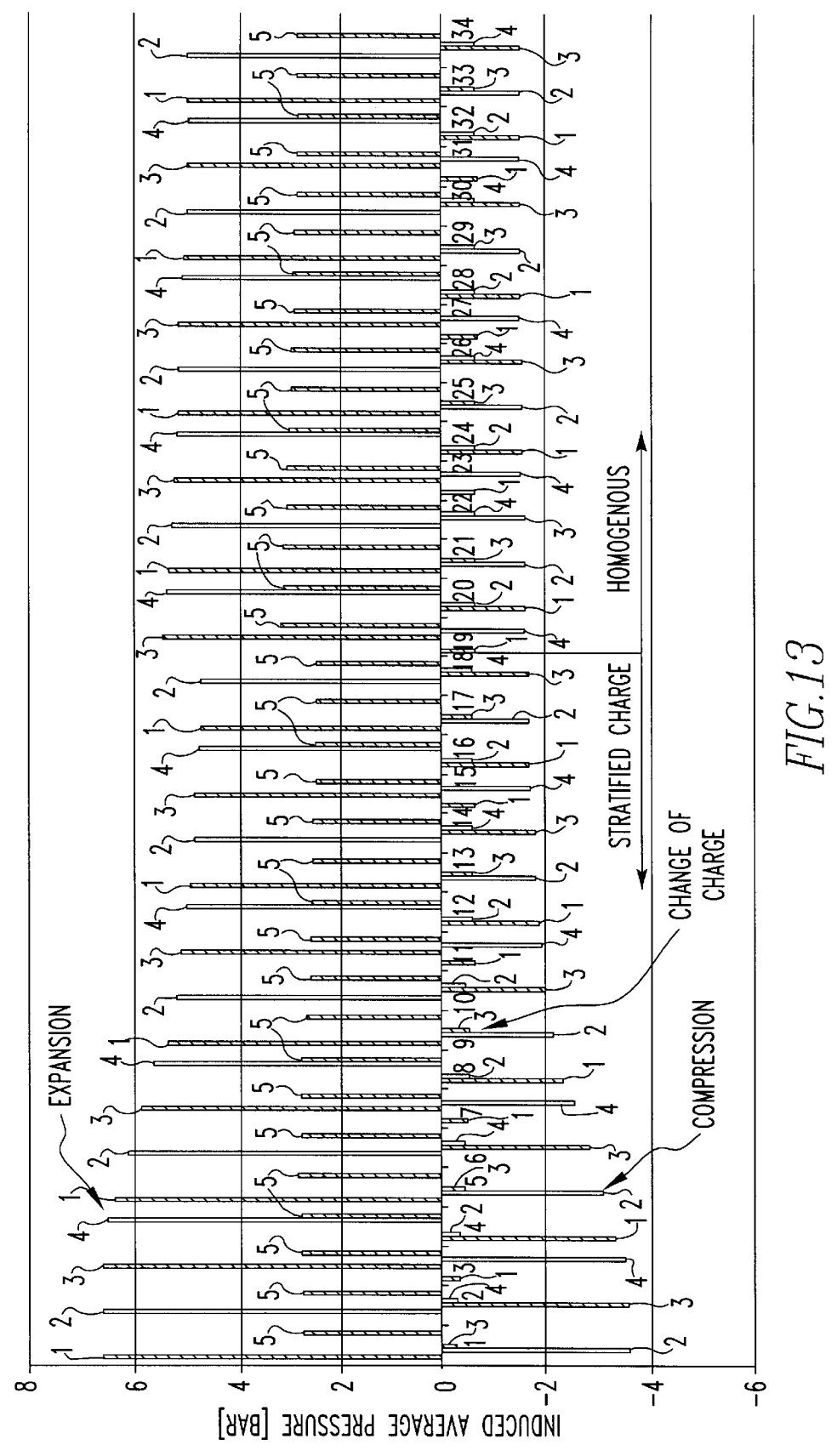

FIG. 11 shows a simulation of the conditions in a direct-injection spark ignition engine when switching from stratified charge mode to the homogeneous mode without use of the method according to the invention. The torque of each engine period can be calculated from the charge exchange, compression and expansion components, as is also illustrated in FIG. 13. The calculation was made assuming a constant mass flow of fuel. The engine torque which is output rises initially during the switching process as a result of the compression work which is reduced. Subsequently, the torque drops as a result of the smaller expansion. This must be compensated by an increased mass flow of fuel.

During the switching to the homogeneous operation, the excess torque generated in the homogeneous mode must be reduced by means of the measures described (adjustment of the ignition time, change of the $\lambda$ value) while the method according to the invention is being used, to such an extent that the jump illustrated in FIG. 11 does not occur. In the example shown, the system is switched to homogeneous mode starting from the engine period 21. The remaining steady-state deviation originates, in the simulation, from the changed efficiencies between the stratified charge mode and homogeneous mode, of which further account has not been taken here.

As a result of the use of the present invention, it is therefore possible to compensate this illustrated jump in the torque in a synchronized fashion from one working cycle to the next.

In the representation in FIG. 11, the uninterrupted curve represents the indexed torque, and the dashed curve the indexed average pressure $p_{mi}$. The working period is represented on the horizontal axis. The values of the indexed torque are given in Nm on the right-hand side of the vertical axis, as axis labeling, and the axis labeling on the left-hand side signifies the indexed average pressure $p_{mi}$ in bar. The simulation was made at a constant engine speed of 2000 rpm and with a displacement $V_H$ of 1.41.

Figure 12:
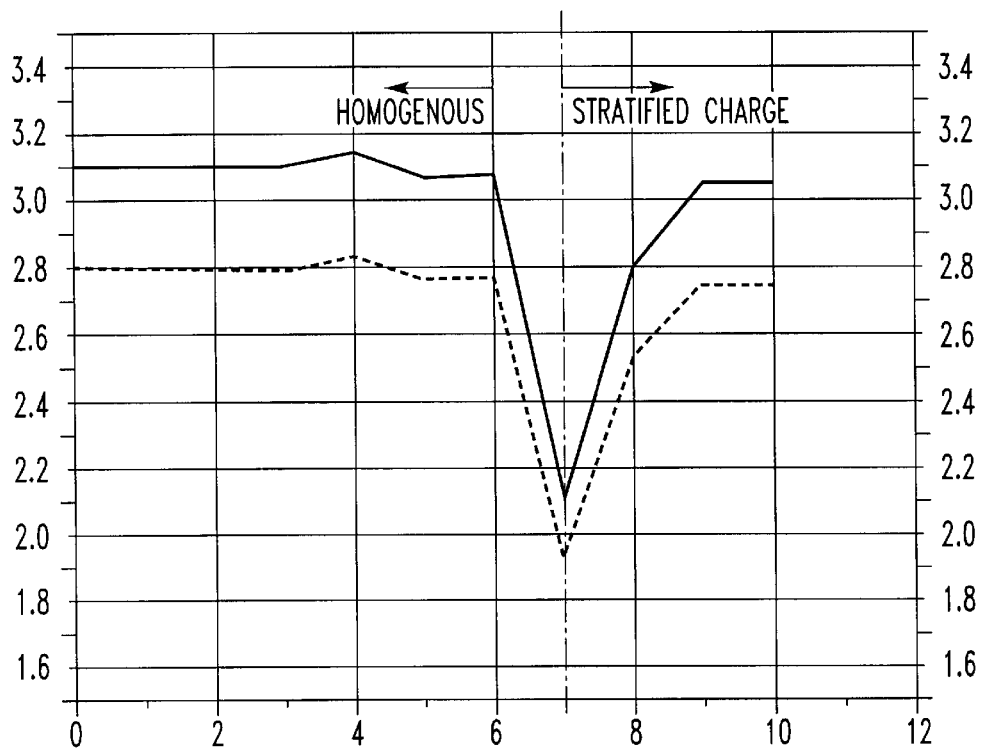

FIG. 12 shows the conditions during the switching from homogeneous mode into the stratified charge mode. The labeling on the axes and the peripheral conditions of the simulation are the same here as those already explained in conjunction with FIG. 11. The torque initially remains the same in the homogeneous mode because the expansion work cannot increase until the increased charge begins to burn in the corresponding cylinder. When the throttle valve is actuated in order to set the stratified charge mode, there is a short-term increase in the crank shaft torque (working cycle 4) owing to the reduction in the charge exchange work of the cylinder in the intake period. This increase in torque can be compensated by an intervention in corresponding manipulated variables. Here, relatively early time of switching is selected because an engine period later causes the expansion torque to rise extremely strongly, with the result that it would no longer be possible to correct it with an intervention in the ignition time alone.

The first combustion in the stratified charge mode firstly gives rise to a torque notch owing to the increased compression work and lower expansion work. This torque notch can be compensated by increasing the mass flow rate of the fuel or—if this is not possible—by switching over one period later and a corresponding selection of the combustion method for individual cylinders. For example, it is possible firstly to set a cylinder to the value $\lambda=1.4$, which however continues to be operated in a homogeneous mode in order to keep the output torque constant.

By using the present invention it is therefore possible, even in this switching process, to compensate the jump in the torque by means of the control which is carried out in a synchronized fashion from one working cycle to the next.

FIG. 13 shows a switching process. The necessary indexed torque can be determined for each working cycle because the charge exchange work and compression work are fixed.

The indexed torque is plotted on the vertical axis. The working periods are represented on the horizontal axis. The number 1 designates the cylinder 1, the number 2 the cylinder 2, the number 3 the cylinder 3 and the number 4 the cylinder 4. The resulting torque is referred to in each case by the number 5 as an indexed average pressure.

This switching pattern can be stored in a control unit. It is advantageously possible to determine in advance which torques have to be set to make it possible to determine, from the instantaneous conditions, which interventions in the manipulated variables are necessary. In terms of the reliability of interventions in the manipulated variables, for example from the point of view of the exhaust gases, it is possible to predefine therefrom an optimized switching point which can be selected such that only manipulated variable interventions which are appropriately permitted are necessary.

What is claimed is:

1. A method for controlling an internal combustion engine by means of interventions in at least one manipulated variable of the internal combustion engine said method comprising the steps of: determining a setpoint torque or work which is to be provided at the crankshaft of the internal combustion engine, determining, with respect to a first variable representing work which is to be performed or a setpoint torque to be provided, a corresponding setpoint quantity of heat taking into account the instantaneous actual efficiency setting at least one associated manipulated variable in accordance with the value of the setpoint quantity of heat, sensing the actual quantity of heat is also determined, and determining a setpoint efficiency from the actual quantity of heat taking into account the work which is to be performed or the setpoint torque which is to be provided, and setting at least one manipulated variable of the internal combustion engine approximately simultaneously in accordance with a setting of the determined setpoint efficiency for controlling the engine.

2. A method according to claim 1, wherein the intake work of the cylinder in the intake period in the respective working cycle, the compression work of the cylinder in the compression period in the respective working cycle, the combustion work of the cylinder in the combustion period in the respective working cycle and the expulsion work of the cylinder in the expulsion period in the respective working cycle are taken into account in the respective working cycle during the determination of the work which is to be performed at the crankshaft.

3. A method according to claim 1, wherein a control error of an induced torque at the crankshaft is derived from a deviation of the rotational speed of the crankshaft from a setpoint rotational speed, and this control error is taken into account in the determination of the setpoint torque or the work which is to be performed at the crankshaft.

4. A method according to claim 1, wherein, when it is necessary to change the intake manifold pressure during operation of the internal combustion engine, the change in the setting of a throttle valve is increased by a precise absolute value and for such a period of time that the increase in the setting of the throttle valve corresponds approximately to the air mass flow rate which is required to set the internal combustion engine to the new load state.

5. A method according to claim 4, wherein for a change the intake manifold pressure during operation of the internal combustion engine, a time profile of the throttle valve setting is determined in such a way that the new intake manifold pressure is set in a way which is optimized with respect to time on the basis of the time profile of the mass flow rate which is set as a result of the throttle valve setting.

6. A method according to claim 4, wherein a time profile of the anticipated value of the mass flow rate which is set or of the intake manifold pressure which is set is determined on the basis of the time profile of the throttle valve setting, the actual value of the mass flow rate or of the intake manifold pressure is determined, and, when there is a deviation of the actual value from the associated anticipated value, the throttle valve is adjusted so as to eliminate the deviation.

7. A method according to claim 1, wherein individual cylinders of the internal combustion engine are shut off, in a first step it is tested whether the calculated mass volumetric efficiency can be set appropriately for operation with a reduced number of cylinders, in a further step, a throttle valve is actuated in such a way that the intake manifold pressure corresponds to the mass volumetric efficiency with a reduced number of cylinders, in which case, during this step, the torque at the crankshaft is set in a synchronized fashion from one working cycle to the next by an intervention in manipulated variables which influence the efficiency, in which case the cylinders are shut off when the corresponding intake manifold pressure is reached.

8. A method according to claim 1, wherein cylinders which have been shut off are connected as the throttle valve is actuated in such a way that the intake manifold pressure corresponds to the mass volumetric efficiency with the full number of cylinders, in which case the cylinders which have been shut off are connected simultaneously and the torque at the crankshaft is set in a synchronized fashion from one working cycle to the next at the crankshaft by means of an intervention in manipulated variables which influence the efficiency.

9. A method according to claim 1, wherein the internal combustion engine is a direct-injection spark ignition engine, wherein, at least one pattern for switching over from the stratified charge into the homogeneous mode, and vice versa, is stored in a control unit in which the torques which are to be set in each working cycle during the switching process are stored, and in which case the switching time is defined by reference to the torques in the respective pattern which are to be set, in such a way that the torques which are to be set can be set during the switching process by means of permitted interventions in manipulated variables which influence the efficiency.

* * * * *